United States Patent [19]
James

[11] 3,837,086
[45] Sept. 24, 1974

[54] COMPASS COUPLER
[75] Inventor: Robert L. James, Bloomfield, N.J.
[73] Assignee: The Bendix Corporation, Teterboro, N.J.
[22] Filed: Aug. 31, 1972
[21] Appl. No.: 285,266

[52] U.S. Cl............................................. 33/317 D
[51] Int. Cl............................................ G01c 17/38
[58] Field of Search........................... 33/316–317 D

[56] References Cited
UNITED STATES PATENTS
2,599,124  6/1952  Pritchard et al.................. 33/317 R
2,666,268  1/1954  Kliever............................. 33/317 R FOREIGN PATENTS OR APPLICATIONS
586,506  3/1947  Great Britain................... 33/317 D Primary Examiner—William D. Martin, Jr.
Attorney, Agent, or Firm—Anthony F. Cuoco; S. H. Hartz

[57] ABSTRACT

Apparatus for comparing heading angle information provided by a directional gyro with that provided by a magnetic heading device (compass), and providing a bipolar d.c. error signal corresponding to the long time average difference therebetween. The error signal may be used to drive an indicating device or to torque the gyro until the heading error is washed out.

8 Claims, 1 Drawing Figure

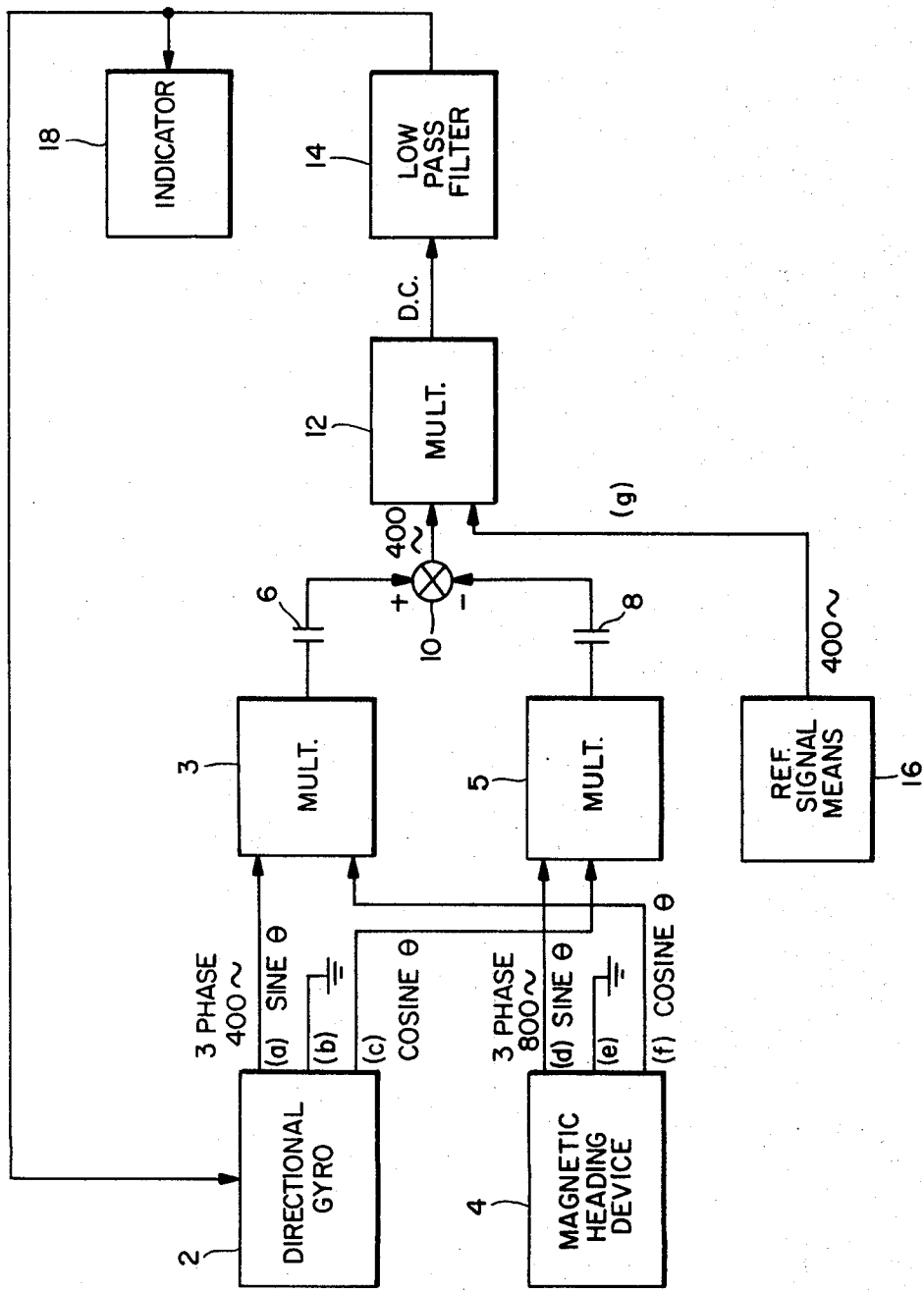

COMPASS COUPLER

BACKGROUND OF THE INVENTION

1. Field of the Invention

This invention relates to apparatus used in flight control systems for coupling directional gyros and magnetic heading devices and, more particularly, to apparatus for detecting the long time average difference in heading angle indications provided by said devices.

2. Description of the Prior Art

Apparatus of the type described must accommodate wide differences in the level of the signals provided by the gyro and magnetic heading devices, different signal frequencies and large waveform distortion in the magnetic heading device signal. The apparatus of the present invention makes these accommodations by utilizing an arrangement of microcircuitry which has the advantages of reduced cost and economy of size and weight as compared with conventional electromechanical devices heretofore known in the art.

SUMMARY OF THE INVENTION

This invention contemplates an arrangement for multiplying corresponding gyro and magnetic heading device alternating output signals and for removing d.c. signal components and multiplier offsets from the resulting pair of multiplied signals, after which said resulting signals are subtracted to provide a difference signal. The difference signal is multiplied by a reference signal which effectively demodulates the difference signal and ripple is removed from the last mentioned multiplied signal leaving a d.c. signal proportional to the sine function of the difference in heading angle indications provided by the directional gyro and magnetic heading devices. A null signal indicates that said indications are equal.

One object of this invention is to provide novel circuitry employing the principle of multiplicative demodulation for detecting the long time average difference in heading angle indications provided by directional gyro and magnetic heading devices.

Another object of this invention is to provide apparatus of the type described which accommodates wide differences in level of the gyro and magnetic heading device signals, different signal frequencies and large waveform distortion of the magnetic heading device signal.

Another object of this invention is to provide apparatus of the type described which accomplishes the aforenoted simply and at a reduced cost.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

The single FIGURE in the drawing is a block diagram showing the device of the invention.

DESCRIPTION OF THE INVENTION

The output element of a directional gyro 2 provides three-wire 400 cycle sinusoidal signals (a), (b) and (c). The output element of a magnetic heading device 4 provides three-wire 800 cycle output signals (d), (e) and (f). Signals (b) and (e) are grounded, signals (a) and (f) corresponding to the sine of heading angle $\theta$ are applied to a multiplier 3 and signals (c) and (d) corresponding to the cosine of heading angle $\theta$ are applied to a multiplier 5.

Multiplier 3 multiplies signals (a) and (f) and provides a 400 cycle sinusoidal signal which is applied to a blocking capacitor 6 for removing d.c. signal components and multiplier offsets. Multiplier 5 multiplies signals (c) and (d) and provides a 400 cycle sinusoidal signal which is applied to a blocking capacitor 8 for removing d.c. signal components and multiplier offsets.

A summing means 10 connected to capacitors 6 and 8 subtracts the blocked signals therefrom to provide a 400 cycle sinusoidal signal which is applied to a multiplier 12. A 400 cycle sinusoidal reference signal (g) from a reference signal means 16 is applied to multiplier 12. Multiplier 12 multiplies the applied signals to provide a demodulated constant level d.c. signal The constant level signal from multiplier 12 is applied to a low pass filter 14 which removes ripple from the signal. The output from low pass filter 14 is an error signal proportional to the sine function of the difference in heading angle indication provided by gyro 2 and magnetic heading device 4. A null output indicates that said heading angle indications are equal. The heading error signal from filter 14 may be applied to a suitable utilizing device such as an indicator 18 for providing a heading angle error indication or may be applied to a gyro torquer in gyro 2 torque gyro 2 until the error is washed out.

OPERATION OF THE INVENTION

Compass coupling presents several problems. These problems are due to the very large distortion of the output signal from the magnetic heading device, the very low level of this output signal and the different carrier frequency (800 cycles) of the magnetic heading device signal compared with the carrier frequency (400 cycles) of the directional gyro signal. The device of the invention uses the principle of multiplicative demodulation as implemented by multiplier 12 to alleviate these problems.

Because of the four quadrant multiplication performed by the disclosed structure, the large distortion in the magnetic heading device signal appears simply as ripple at the output of multiplier 12 which may be easily separated from the d.c. output signal component by filter 14. The different carrier frequencies of the directional gyro and magnetic heading device signals result in the signal from summing means 10 being in the form of a modulated 400 cycle carrier, with multiplier 12 multiplying the signal by the 400 cycle reference signal and effectively demodulating the signal to provide the desired d.c. output.

The device of the invention may be implemented by using commercially available logic type microelectronics components in integrated circuit packages for achieving the desired results simply and at a reduced cost. For example, multipliers 3, 5 and 12 may be of the type marketed by the Motorola Semiconductor Products Div. as types MC1595L, MC1495L as described in the Motorola Microelectronics Data Book, 2nd, Ed., 1969.

It will now be seen that novel means for detecting the long time average difference in heading angle indications provided by directional gyro and magnetic heading devices has been disclosed. The multiplicative demodulation performed by multiplier 12 insures that large amounts of distortion in the magnetic heading device signal waveform do not deteriorate accuracy of computation of the differential heading angle, and whereby different carrier frequencies of directional gyro and magnetic heading device signals can be tolerated.

Although but a single embodiment of the invention has been illustrated and described in detail, it is to be expressly understood that the invention is not limited thereto. Various changes can also be made in the design and arrangement of the parts without departing from the spirit and scope of the invention as the same will now be understood by those skilled in the art.

What is claimed is:

1. Apparatus for coupling a directional gyro which provides a pair of alternating heading angle signals at a first frequency and a magnetic heading device which provides a pair of alternating heading angle signals at a second higher frequency, said apparatus comprising:

means connected to the gyro and to the magnetic heading device for multiplying corresponding signals therefrom and for providing first and second signals at the first frequency;

means for providing a reference signal at the first frequency; and means connected to the multiplying means and to the reference signal means and responsive to the signals therefrom for providing a constant heading error signal.

2. Apparatus as described by claim 1, wherein:

the gyro and magnetic heading devices each provide signals corresponding to the sine and cosine of the heading angle; and the multiplying means includes a first multiplier for multiplying the gyro and magnetic heading device sine signals for providing the first signal, and a second multiplier for multiplying the gyro and magnetic heading device cosine signals for providing the second signal.

3. Apparatus as described by claim 2, wherein the means connected to the multiplying means and to the reference signal means and responsive to the signals therefrom for providing a constant heading error signal includes:

means connected to the first and second multipliers for summing the first and second signals therefrom for providing a summation signal at the first frequency;

another multiplier connected to the summing means and to the reference signal means for multiplying the signals therefrom and for providing a constant level demodulated signal; and filter means connected to said multiplier for filtering the signal therefrom to provide the heading error signal.

4. Apparatus as described by claim 1, including:

means connected to the last mentioned means and responsive to the signal therefrom for indicating the heading error.

5. Apparatus as described by claim 1, including:

the gyro connected to the last mentioned means and torqued by the signal therefrom to wash out the heading error.

6. Apparatus as described by claim 3, including:

a first capacitor connected intermediate the first multiplier and the summing means for removing d.c. signal components and multiplier offsets from the first signal; and a second capacitor connected intermediate the second multiplier and the summing means for removing d.c. signal components and multiplier offsets from the second signal.

7. Apparatus including heading angle sensing devices and means for coupling said devices, comprising:

a directional gyro for providing alternating signals corresponding to the sine and cosine of the heading angle sensed thereby, said signals being at a first frequency;

a magnetic heading device for providing alternating signals corresponding to the sine and cosine of the heading angle sensed thereby, said signals being at a second higher frequency;

first means connected to the gyro and to the magnetic heading device for multiplying the sine signals therefrom;

second means connected to the gyro and to the magnetic heading device for multiplying the cosine signals therefrom;

means for summing the signals from the first and second multipliers and for providing a summation signal at the second frequency; and means connected to the multiplying means and to the reference signal means and responsive to the signals therefrom for providing a constant level error signal.

8. Apparatus as described by claim 7, including:

utilizing means connected to the heading error signal means for utilizing the signal therefrom.

* * * * *